United States Patent [19]

Inoue

[11] 3,939,938

[45] Feb. 24, 1976

[54] AUTOMOTIVE STEERING SYSTEM

[75] Inventor: Naohiko Inoue, Yokohama, Japan

[73] Assignee: Nissan Motor Co., Ltd., Yokohama, Japan

[22] Filed: Mar. 4, 1974

[21] Appl. No.: 447,740

[30] Foreign Application Priority Data

Mar. 5, 1973 Japan............................ 48-25793
Mar. 20, 1973 Japan............................ 48-31388

[52] U.S. Cl............................. 180/79.2 R; 91/380
[51] Int. Cl.²........................................... B62D 5/08
[58] Field of Search.............. 180/79.2 R, 79.2 D; 74/388 PS; 91/380

[56] References Cited
UNITED STATES PATENTS

| | | | |
|---|---|---|---|
| 2,802,674 | 8/1957 | Jackson | 91/380 X |
| 2,858,805 | 11/1958 | Lincoln et al. | 91/380 X |
| 2,897,684 | 8/1959 | Lincoln et al. | 180/79.2 R X |
| 2,968,189 | 1/1961 | Walko | 74/388 PS |
| 2,990,902 | 7/1961 | Cataldo | 180/79.2 D |
| 3,011,579 | 12/1961 | Milliken et al. | 180/79.2 D |
| 3,310,284 | 3/1967 | Inaba et al. | 91/380 X |

*Primary Examiner*—Leo Friaglia
*Assistant Examiner*—John A. Pekar

[57] ABSTRACT

Herein disclosed is an automotive power-assisted steering system which comprises a hydromechanical leverage unit drivingly connected to a steering linkage, a rotary piston-valve hydraulically connected to the leverage unit, a motor to move the piston-valve for actuating the leverage unit to a right-turn or left-turn position, and a valve re-set mechanism connected between the leverage unit and the piston-valve for moving the valve into an equilibrium position from a condition bringing the leverage unit into the right-turn or left-turn position, wherein the motor is energized by a pulsating current which is controlled in accordance with a signal representative of the angle and direction of turning of a steering wheel and, where desired, signals representative of a vehicle velocity and an external force which may be sideways imparted to the vehicle by a side wind blowing onto the vehicle. To make it possible to steer the vehicle in a manual, non-assisted fashion, clutch means may be interposed between the steering wheel and the leverage unit.

11 Claims, 4 Drawing Figures

AUTOMOTIVE STEERING SYSTEM

The present invention relates to steering systems of automotive vehicles and, more particularly, to an automotive steering system of the nature which is controlled in an electro-hydraulic fashion.

Existing steering systems of automotive vehicles generally have steering wheels which are mechanically connected to steered road wheels and, for this reason, gear ratios available of the steering systems are dictated solely by the angular positions of the steering wheels. The steering wheel should therefore be turned through a relatively large angle to steer the road wheels when the vehicle is being driven at a relatively low velocity. When, conversely, the vehicle is being driven at a relatively high velocity, the road wheels are extremely sensitive to an angular motion of the steering wheel and thus the vehicle tends to be over-steered by a slight turn of the steering wheel, requiring highly skilled steering techniques and meticulous steering wheel manipulation of the vehicle driver for the purpose of driving the vehicle with safety. The prior art steering systems have thus been designed and engineered with a view to providing a compromise between mutually confilicting requirements of the steering systems under low and high speed driving conditions of the automotive vehicles.

Such a compromise gives rise to an importance of the role of the vehicle driver who predominates over the command of the vehicle responsive to various driving conditions to be encountered during cruising. When, especially, the vehicle is being driven at a relatively high velocity and thus tends to sensitively respond to cruising conditions, the driver of the vehicle is required to keep a strict vigilance over the behaviours of the vehicle so as to avoid a serious accident that would otherwise be caused as a result of an erroneous or slightly belated action of the driver to control the vehicle. When, for example, the vehicle being driven at a relatively high velocity is sideways blown with a high wind and is bodily urged to laterally move, the driver of the vehicle is compelled to steer the vehicle so as to quickly correct the course of the vehicle changed by a force which is thus imparted to the side of the vehicle. All these problems result from the difficulty of maintaining a driver's efficient control over the steering of the vehicle being driven at a relatively high velocity. Such problems will therefore be solved at a stroke if arrangements are made in the steering systems so that the factors which affect the performance characteristics of the steering systems. A variety of attempts have thus far been made to achieve this end, none of such attempts having proved completely successful primarily because of the unwieldy, disproportionately large-sized and intricate constructions which are costly to manufacture and space-taking to be installed in automotive vehicles. The present invention thus contemplates elimination of all the above mentioned drawbacks of the existing automotive steering systems.

It is, accordingly, an important object of the present invention to provide an improved automotive power-assisted steering system which is capable of stably and efficiently steering an automotive vehicle irrespectively of various external factors that affect the performance characteristics of the steering system.

It is another important object of the invention to provide an improved automotive power-assisted steering system which is adapted to efficiently steer an automotive vehicle being driven at a relatively low velocity and to provide sufficient stability in steering the vehicle being driven at a relatively high velocity.

It is still another important object of the invention to provide an improved automotive power-assisted steering system with which an operator of the steering system is releaved of the burden which has thus far been imposed on his in steering the vehicle especially when the vehicle is being driven at a relatively high velocity and/or the vehicle is sideways blown with a high wind.

It is still another important object of the invention to provide an improved automotive power-assisted steering system which is reliable in operation and which is simple in construction and accordingly economical to manufacture.

Yet, it is another important object of the present invention to provide an improved automotive power-assisted steering system which can be shifted from a power-assisted condition to a manually operated condition in the event a failure takes place in a hydraulic control circuit incorporated into the steering system.

It is, thus, a general object of the present invention to provide an automotive power-assisted steering system which will enable a vehicle driver to safely maneuver a vehicle without resort to skilful techniques under any cruising conditions of the vehicle.

In accordance with the present invention, these and other objects will be accomplished generally in a steering system which comprises, in combination with a usual steering wheel and a usual steering linkage connected to steered road wheels, a hydromechanical leverage unit mechanically connected to the steering linkage and movable between a right-turn positional range to drive the steering linkage into a condition effecting right-turn of the steered road wheels and a left-turn positional range to drive the steering linkage into a condition effecting left-turn of the steered road wheels, a rotary piston-valve rotatable about a longitudinal axis thereof and longitudinally movable between first and second positional ranges across an equilibrium position depending upon its rotational position about the axis, the rotary piston-valve being hydraulically connected to the leverage unit for moving the leverage unit into the right-turn or left-turn positional range when moved to the first or second positional range, respectively, thereof or holding the leverage unit in a locked condition when moved to the equilibrium position, a valve re-set mechanism operatively connected between the leverage unit and the rotary piston-valve and operative to be driven by the leverage unit for longitudinally moving the rotary piston-valve from the first or second positional range back to the equilibrium position when the leverage unit is moved by the piston-valve to the right-turn or left-turn positional range, respectively, thereof, a drive source having an output shaft drivingly connected to the rotary piston-valve for driving the piston-valve about the axis thereof when actuated, and an electric control circuit including means responsive to turning of the steering wheel for producing a signal related to the angle and direction of turning of the steering wheel whereby the drive source is actuated to have its output shaft rotated in a direction and through an angle dictated by the signal from the control circuit.

Where desired, the control circuit may further include means responsive to the velocity of the vehicle so that the electric signal produced by the control circuit is related not only to the turning angle of the steering wheel but to the velocity of the vehicle whereby the output shaft of the motor is rotated through an angle which is diminished as the velocity of the vehicle increases. The control circuit may still further comprise means responsive to an external force imparted sideways to the vehicle so that the electric signal produced by the control circuit is also related to the intensity of the force which is sideways imparted to the vehicle whereby the output shaft of the motor is caused to rotate through an angle which is modified in such a manner as to steer the road wheels through angles which are corrected to compensate for an influence of the force sideways exerted on the vehicle.

In order that the steering system of the nature above described may be shifted from a power-assisted condition to a manually operated condition, the steering system may further comprise hydromechanical clutch means disposed between the steering wheel and the hydromechanical leverage unit, the clutch means being biased into an uncoupled condition so that the steering wheel is urged to remain mechanically disengaged from the leverage unit, and control means responsive to the fluid pressure acting on the leverage unit and the rotary piston-valve for actuating the clutch means to be coupled in response to a decrease of the fluid pressure below a predetermined level so that the hydromechanical leverage unit is mechanically coupled to the steering wheel and rendered operative to be driven direct and mechanically by the steering wheel independently of the rotary piston-valve.

The features and advantages of the automotive power-assisted steering system according to the present invention will become more apparent from the following description taken in conjunction with the accompanying drawings in which:

FIG. 2a is one part of a view which is another preferred embodiment of the steering system according to the present invention.

FIG. 3 is a fragmentary enlarged view showing a portion around the steering wheel shaft shown in FIG. 2a.

Figure 1:
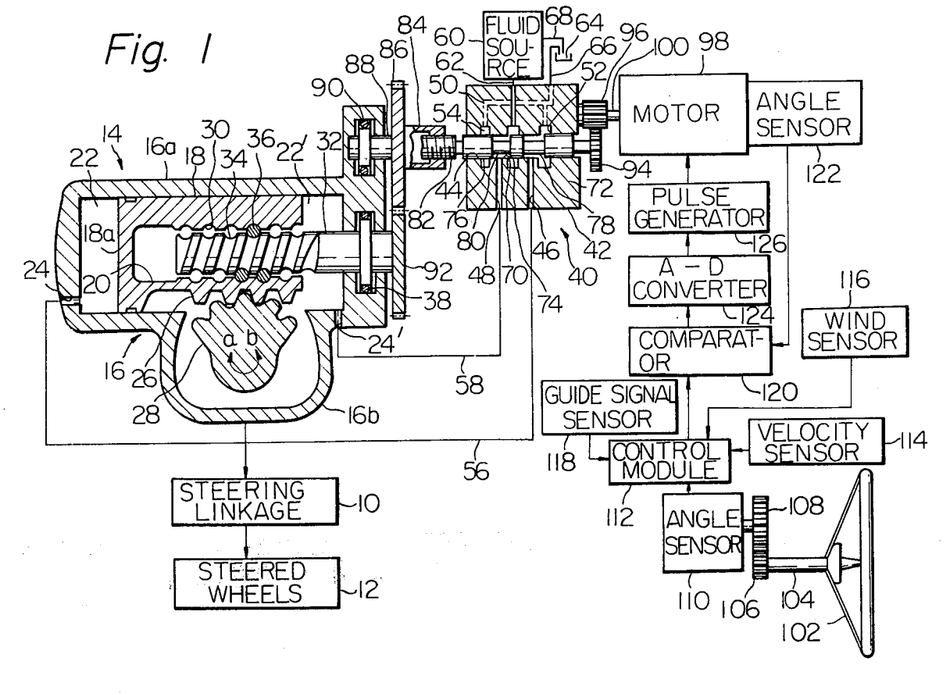
FIG. 1 is a sectional view which shows, partly in a block form, a preferred embodiment of the power-assisted steering system according to the present invention.

Reference will now be made to the drawings, first to FIG. 1. Designated respectively by reference numerals 10 and 12 are a usual steering linkage and steered road wheels of an automotive vehicle into which the steering system according to the present invention is to be incorporated. The steering linkage 10 is connected to the steered road wheels 12 through steering knuckles and wheel spindle assemblies (not shown) as is customary.

A hydromechanical leverage unit 14 has a hermetically sealed housing 16 having a generally cylindrical portion 16a and a pocket portion 16b projecting from the cylindrical portion 16a. A piston 18 is longitudinally slidably received in the cylindrical portion 16a of the housing 16. The piston 18 has an xial bore 20 which is closed at one end by an end wall 18a of the piston 18. The housing 16 is thus internally divided into separate chambers 22 and 22' by means of the end wall 18a of the piston 18 and is formed with ports 24 and 24' through which the chambers 22 and 22', respectively, are connected to a hydraulic circuit to be described later. The piston 18 is formed with a toothed rack 26 which is in constant mesh with a complementary sector gear 28 disposed in the pocket portion 16b of the housing 16. The sector gear 28 is connected to the steering linkage 10 via a Pitman arm and bell-joint connection (not shown) as usual and is rotatable about its axis in directions of arrows a and b as the piston 18 is moved back and forth thereon, the directions of arrows a and b being herein assumed to be those to effect right and left turns, respectively, of the steered road wheels 12 through the steering linkage 10.

The piston 18 is formed with a helical groove 30 in its inner wall defining the axial bore 20. A shaft 32 extends into the bore 20 of the piston 18 and is also formed with a helical groove 34 corresponding to the helical groove 30 in the piston 18. A continuous chain of balls 36 are received in these helical grooved 30 and 34 so that the piston 18 and the shaft 32 engage each other through the balls 36. The shaft 32 is rotatably received in bearings 38 mounted on the housing 16 and projects outwardly of the housing 16 through an end wall of the housing opposite to the end wall 18a of the bored piston 18 as shown. The axial movement of the piston 18 in the cylindrical portion 16a of the housing 16 thus brings about turning motion of the shaft 32 about an axis thereof through the balls 36. The grooved shaft 32 and the balls 36 form part of a valve re-set mechanism which acts on a hydraulic control valve unit designated by reference numeral 40.

The hydraulic control valve unit 40 comprises a valve housing 42 which is formed with a grooved bore 44 and ports 46 to 54 leading from the grooved bore 44. The ports 46 and 48 are in constant communication with the chambers 22 and 22', respectively, in the housing 16 of the leverage unit 14 through fluid circulation passageways 56 and 58 and the ports 24 and 24' respectively, whereas the port 50 is in communication with a source 60 of a fluid under pressure through a fluid feed passageway 62. Though not shown in the drawing, the source 60 of the pressurized fluid is usually composed of a hydraulic pump and a fluid reservoir. The ports 52 and 54 are drawing ports and are thus routed to a pump 64 via a fluid drain passageway 66. The fluid drained to the sump 64 is recirculated to the fluid source 60 through a fluid recirculation passageway 68 as usual. In the axial bore 44 of the valve housing 42 is received a rotary piston-valve 70 which is axially slidable in the bore 44 and rotatable about its longitudinal axis. The rotary piston valve 70 has axially spaced lands 72, 74 and 76 wherein the lands 72 and 74 are spaced apart from each other across a circumferential groove 78 and the lands 74 and 76 are spaced apart from each other across a circumferential groove 80. When the rotary piston-valve 70 is longitudinally in an equilibrium position, the lands 72, 74 and 76 are located to close the ports 52, 50 and 54, respectively, so that no passage of fluid takes place through the valve unit 40. When the rotary piston-valve 70 is axially moved rightwardly in the drawing from the equilibrium position, then the lands 72 and 74 are located to open the ports 52 and 50, respectively, so that fluid communication is established between the ports 46 and 52 through the circumferential groove 78 in the piston-valve 70 and between the ports 48 and 50 through the circumferential groove 80 in the piston-valve 70. This longitudinal position of the rotary piston-valve 70 will be referred to as the "right-turn" position and will thus be assumed to effect right turn of the steered road wheels 12. When, conversely, the rotary piston-valve 70 is axially moved leftwardly in the drawing from the equilibrium position, then the leads 74 and 76 thereof are located to open the ports 50 and 54, respectively, so that fluid communication is established between the ports 46 and 50 through the circumferential groove 78 in the piston valve 70 and between the ports 48 and 54 through the circumferential groove 80 in the piston-valve 70. This longitudinal position of the rotary piston-valve 70 will be referred to as the "left-turn" position and will thus be assumed to effect left turn of the steered road wheels 12.

The rotary piston-valve 70 is connected at one longitudinal end to a screw portion 82 which is rotatable about its axis and longitudinally movable together with the rotary piston-valve 70. The screw portion 82 is in engagement with an internally threaded nut member 84 so that the screw portion 82 and the nut member 84 are rotatable relative to each other about the axis of the screw portion 82. The relative rotation between the screw portion 82 and the nut member 84 brings about longitudinal movement of the piston-valve 70 in either direction, as will be discussed later. The nut member 84 is rotatable with a gear 86 which is carried on a shaft 88 rotatably journalled to the housing 16 of the leverage unit 14 through bearings 90. The gear 86 is in constant mesh with a gear 92 which is connected to and rotatable with the helically grooved shaft 32. The combination of the internally grooved inner wall of the piston 18, the grooved shaft 32, the balls 36, the mating gears 92 and 86, the nut 84 and the screw portion 82 of the rotary piston-valve 70 constitutes a valve re-set mechanism which is operative to longitudinally move the rotary piston-valve 70 into the equilibrium position thereof by means of the relative rotation between the screw portion 82 and the nut member 84.

The rotary piston-valve 70 is connected at its end opposite to the screw portion 82 to a gear 94. The gear 94 is in constant mesh with and axially movable on a gear 96 having teeth which a smaller in number than the gear 94. A pulsating-current d.c. motor 98 has an output shaft 100 which is rotatable in both directions when the motor 98 is energized. To have the motor energized to move the piston-valve 70 as desired, there is provided an electric control circuit which is responsive in various conditions in which the vehicle may be placed during operation. One of such conditions is an angular position of a steering wheel which is designated by reference numeral 102. The steering wheel 102, which per se is similar to that of the prior art, is connected through a steering wheel shaft 104 to a gear 106 which is in constant mesh with a gear 108 having a larger number of teeth than the gear 106. The gear 108 is connected to a sensor 110 which is responsive to rotation of the gear 108 and which is thus operative to produce an electric signal representative of the angle and the direction of the turning of the steering wheel 102. The signal thus produced is fed to a control module 112, which is also supplied with an electric signal representative of a vehicle velocity from a vehicle velocity sensor 114. Where desired, the control module 110 may be further supplied with electric signals from a wind sensor 116 which is responsive to a force laterally imparted to the vehicle by a wind which may sideways blow onto the vehicle. The control module 112 is thus adapted to produce an analog output signal which is related to the angle and direction of turning of the steering wheel, the velocity of the vehicle and the force which may be laterally imparted to the vehicle. More specifically, the output signal from the control module 112 is approximately proportional to the angle of rotation of the steering wheel 102 and is decreased as the velocity of the vehicle increases and/or as the force laterally imparted to the vehicle increases if such a force is in the same direction as the direction of turning of the vehicle. As the vehicle velocity decreases and/or the force urging the vehicle sideways is in the opposite direction to the direction of turning of the vehicle, the output signal from the control module 112 is increased. In consideration, furthermore, of future traffic situations in which automotive vehicles are automatically steered by guide signals issuing from control lines embedded in motor highways, a guide signal sensor 118 may also be connected to the control module 112 so that the steering system can be shifted to an automatically controlled mode of operation.

The control module 112 has an output terminal connected to one input terminal of a comparator 120. The other input terminal of the comparator 120 is connected to a sensor 122 responsive to rotation of the output shaft 100 of the pulsating-current d.c. motor 98. The sensor 122 is thus operative to produce an electric signal which is representative of the angle and the direction of rotation of the output shaft 100 of the motor 98. The output signal from the control module 112 is representative of an angular position of the steering wheel 102 as modified by the vehicle velocity and the force urging the vehicle in a lateral direction. The signal from the control module 112 is compared with the signal from the angle sensor 122 by means of a comperator 120, which is thus operative to produce a signal representative of a difference between the angular position of the output shaft 100 of the motor 98 and the modified angular position of the steering wheel 102. The output signal from the comparator 120 is fed to an analog-to-digital converter 124 and is thereby transformed into a digital signal. The digital signal thus produced is supplied to a drive pulse generator 126 which has an output terminal connected to an input terminal of the pulsating-current d.c. motor 98.

The operation of the steering system thus constructed and arranged will now be described.

When the steering wheel 102 is turned to effect right turn of the steered road wheels 12, the rotational motion of the steering wheel 102 is modulated by means of the combinations of the gears 106 and 108 and is thereafter transmitted to the angle sensor 110. The angle sensor 110 thus delivers to the control module 112 an electric signal which is largely proportional to the turning angle of the steering wheel 102. The control module 112 is simultaneously supplied with signals from the vehicle velocity sensor 114 and the wind sensor 116 and produces an output signal which is a function of the turning angle of the steering wheel 102, the velocity of the vehicle and, if the vehicle is being blown with a high side wind, the force which is imparted to the vehicle in a lateral direction. The steering angle dictated by the output signal from the control module is thus not only related to the turning angle of the steering wheel 102 but modulated in such a manner as to be diminished as the velocity of the vehicle increases and/or the vehicle is brown with a side wind in the same direction as the vehicle is to be steered or to be augmented as the vehicle velocity decreases and/or the vehicle is blown with a side wind in a direction opposite to the direction of turning of the vehicle. The output signal thus produced from the control module 112 is compared by means of the comparator 120 with a signal supplied from the angle sensor 122 attached to the motor 98 to drive the rotary piston-valve 70, the comparator 120 thus producing an output signal representative of a difference between the desired angular position and the actual or detected angular position of the output shaft 100 of the motor 98. The output signal from the comparator 120 is thus apparently an analog signal and is thus converted into a pulse signal by means of the analog-to-digital converter 124, causing the drive pulse generator 126 to produce a pulsating drive current with which the pulsating current motor 98 is to be energized. The motor 98 is energized until the pulse signal from the analog-to-digital converter 124 disappears or, in other words, the difference between the output signals from the control module 112 and the angle sensor 122 of the motor 98. As the motor 98 is thus energized with the current from the drive pulse generator 126, the output shaft 100 of the motor 98 is rotated in a direction and through an angle dictated by the pulse signal from the analog-to-digital converter 124 until the output shaft 100 has an angular position which is in agreement with the angular position dictated by the output signal from the control module 112.

The rotational motion of the output shaft 100 of the motor 98 is modified by the combination of the gears 96 and 94 and is thereafter transmitted to the rotary piston-valve 70 of the valve unit 40. The rotary piston-valve 70 is thus driven to rotate about its longitudinal axis relative to the nut member 84 which at this instant is held stationary. As the rotary piston-valve 70 is rotated relative to the nut member 84, it is moved along its longitudinal axis by reason of the threaded engagement between the screw portion 82 of the valve 70 and the nut member 84. In this instance, the rotary piston-valve 70 is assumed to be moved leftwardly of the drawing, viz., toward the nut member 84 as it is rotated in the direction of arrow in FIG. 1 with the steering wheel 102 rotated in the direction to effect right turn of the steered road wheels 12. Under these conditions, the ports 46, 48, 50 and 54 in the valve housing 42 is held open whereas the port 52 is closed by the land 72 of the piston-valve 70 so that fluid communication is established between the ports 46 and 50 across the groove 78 of the piston-valve 70 and concurrently between the ports 46 and 54 across the groove 80. The fluid under pressure is consequently directed from the hydraulic fluid source 60 to the fluid passageway 56 through the port 50, the groove 78 and the port 46 and, at the same time, the fluid in the fluid passageway 58 is passed to the sump 64 through the port 48, the groove 80 and the port 54. The fluid under pressure thus passed from the hydraulic fluid source 60 to the fluid passageway 56 is admitted into the chamber 22 in the housing 16 through the port 24 and acts on the piston 18, whilst the fluid in the chamber 22' in the housing 18 is discharged into the fluid passageway 58 through the port 24' and is drained from the passageway 56 into the sump 64 through the drain port 54 in the valve housing 42. A differential fluid pressure is thus developed across the piston 18, which piston is accordingly moved rightwardly of the drawing, viz., away from the end wall of the housing 18 adjacent to the end wall 18a of the piston 18. This causes the sector gear 28 to turn clockwise, viz., in the direction of arrow a about its axis, which rotational motion of the sector gear 28 is transmitted to the steering linkage 10 through the Pitman arm (not shown) so that the steered road wheels are turned rightwardly of the vehicle through an angle which is dictated by the angle of turning of the sector gear 28 and accordingly by the amount of longitudinal displacement of the piston 18. The amount of longitudinal displacement of the piston 18 is, in turn, disciated by the amount of displacement and accordingly the angle of rotation of the rotary piston-valve 70 so that the steered road wheels 12 are turned through an angle which is determined by the signal delivered from the control module 112.

When the piston 18 is longitudinally moved in the housing 16 by reason of the differential fluid pressure built up between the chambers 22 and 22' as above mentioned, the grooved shaft 32 is caused to rotate about its axis by reason of a rotational action exerted thereon from the piston 18 through the balls 36 received in between the aligned helical grooves 30 and 34 in the piston 18 and the shaft 32, respectively. Such an angular motion of the grooved shaft 32 is transmitted through the mating gears 92 and 86 to the nut member 84, which is consequently driven to rotate relative to the screw portion 82 of the rotary piston-valve 70 in the same direction as the rotary piston-valve has been turned about its axis by the motor 98. The rotation of the nut member 84 on the screw portion 82 of the rotary piston-valve 70 brings about rightward longitudinal movement of the piston-valve 70. The rotary piston-valve 70 is thus longitudinally moved away from the nut member 84 until the nut member 84 has turned about its axis through an angle which equals the angle through which the rotary piston-valve 70 has been rotated by the motor 98. When the nut member 84 has turned the angle equal to the angle of rotation of the piston-valve 70, then the rotary piston-valve 70 is brought into the equilibrium position closing all of the ports 46, 48, 50, 52 and 54 formed in the valve housing 42. The fluid passageways 56 and 58 are thus isolated from the hydraulic fluid source 60 and the sump 64 and, as a consequence, the piston 18 and accordingly the sector gear 28 are maintained in locked conditions.

The left turn of the steered road wheels 12 will be effected essentially in similar manners to those effecting the right turn of the road wheels. When, thus, the steering wheel 102 is turned to effect the left turn of the steered road wheels 12, the control module 112 produces an electric signal which is related to the angle of rotation of the steering wheel, the velocity of the vehicle, and the force which may be being imparted to the vehicle in a lateral direction by a wind, if any, which is sideways blowing onto the vehicle. the pulsating-current d.c. motor 98 is thus energized by the drive pulse generator 126 until the output shaft 100 of the motor 98 has been turned through an angle corresponding to a difference between the output signals from the control module 112 and the angle sensor 122 responsive to the angle of rotation of the motor output shaft 100. The rotary piston-valve 70 is consequently driven to rotate about its axis through an angle proportional to the angle of rotation of the motor output shaft 100 and is therefore longitudinally moved rightwardly of the drawing, viz., away from the nut member 84 on which the screw portion 82 of the piston-valve 70 is rotated. The rotary piston-valve 70 is in this manner moved to a longitudinal position in which the ports 46, 48, 50 and 52 are open and the port 54 is closed by the land 76 of the piston-valve 70. Under these condition, fluid communication is established between the ports 48 and 50 across the groove 80 in the piston valve 70 and concurrently between the ports 48 and 50 across the groove 78. The fluid under pressure is therefore directed from the hydraulic fluid source 60 to the fluid passageway 58 through the port 50, the groove 80 and the port 48 and, at the same time, the fluid in the fluid passageway 56 is passed to the sump 64 through the port 46, the groove 78 and the port 52. The fluid under pressure thus passed from the hydraulic fluid source 60 to the fluid passageway 58 is admitted to the chamber 22' in the housing 16 through the port 24' and acts on the piston 18 whilst the fluid in the chamber 22 in the housing 16 is discharged into the fluid passageway 56 through the port 24 and is drained from the passageway 56 into the sump 64 through the drain port 52 in the valve housing 42. The piston 18 in the housing 16 is consequently subjected to a differential pressure developed between the chambers 22 and 22' in the housing 16 and is consequently longitudinally moved by the differential pressure leftwardly of the drawing, viz., toward the end wall of the housing 16 adjacent to the end wall 18a of the piston 18. As a result of the longitudinal movement of the piston 18, the sector gear 28 meshing with the toothed rack 26 is turned about its axis counter clockwise of the drawing or in the direction of arrow b in FIG. 1, bringing about right turn of the steered road wheels 12 through the steering linkage 10.

As the piston 18 is moved leftwardly of the drawing, the grooved shaft 32 is rotated about its axis so that the nut member 84 is rotated on the screw portion 82 of the rotary piston-valve 70 through the mating gears 92 and 86. When the nut member 84 is turned in the same direction and through the same angle as the rotary piston-valve 70 has been turned about its axis by the motor 98, the piston-valve 70 is brought into the equilibrium position closing all of the ports 46, 48, 50, 52 and 54 in the valve housing 42 so that the piston 18, the sector gear 28 and the steering linkage 10 are held in locked conditions.

From the foregoing description, it will have been appreciated that the steered road wheels of the vehicle can be turned through angles which are related to the angles of turning of the steering wheel 102 and which are automatically modified in a manner to be optimum for the detected velocity of the vehicle and/or the force of the wind sideways blowing onto the vehicle. Where the vehicle is driven into a road equipped with automatic vehicle guide means, the control module 112 is supplied with signals from the guide signal sensor 118 and, where desired, the signals from the vehicle velocity sensor 114 and the wind sensor 116 as well so that the vehicle is steered independently of the steering wheel 102.

Figures 2A, 3:
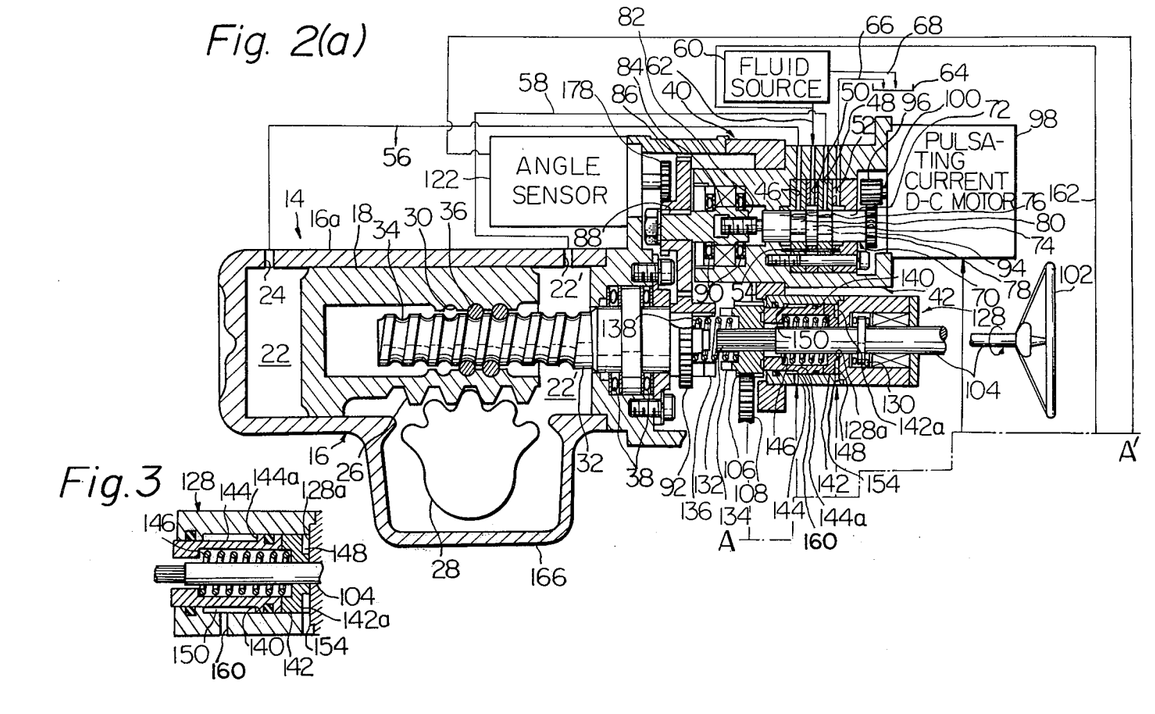
Figure 2B:
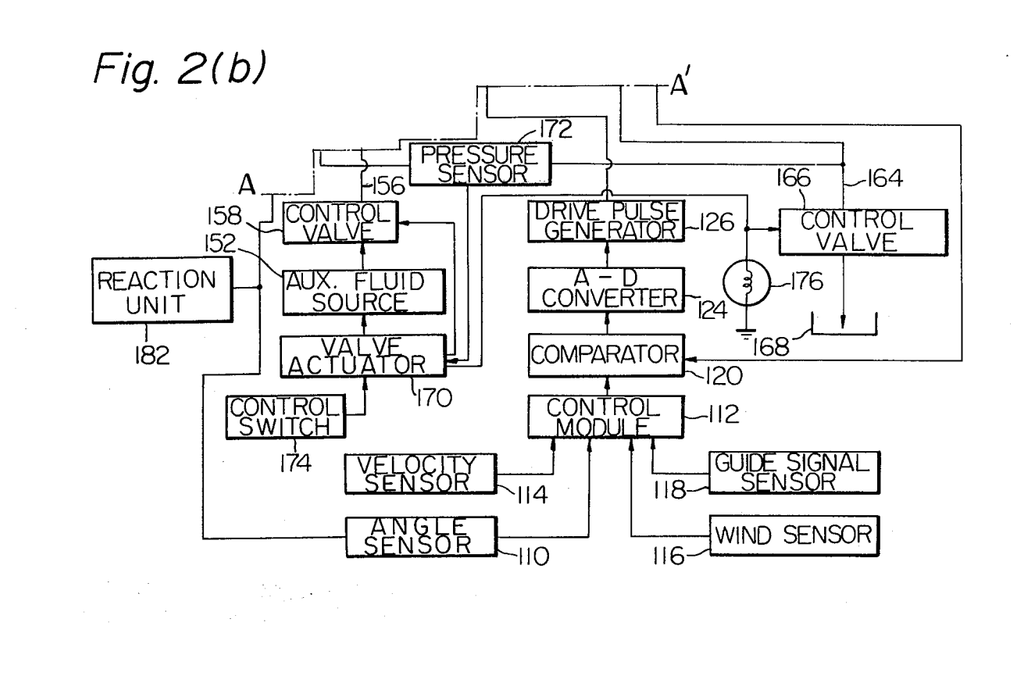
FIG. 2b is the other part of the view of the another preferred embodiment.

FIG. 2 illustrates another preferred embodiment of the automotive steering system according to the present invention. The embodiment herein illustrated is intended to add to the reliability of the embodiment thus far described with reference to FIG. 1 and thus has means which are adapted to shift the steering system from the power assisted mode to a manually operated mode in the event a failure happens to take place in the hydraulic arrangement of the steering system. Thus, the embodiment shown in FIG. 2 has incorporated therein all the components and parts of the embodiment of FIG. 1, such components and parts being therefore designated by the same reference numerals and characters as those illustrated in FIG. 1.

In the embodiment shown in FIG. 2, the steering wheel shaft 104 is arranged to be axially in line with the helically grooved shaft 32. The steering wheel shaft 104 is supported on a steering shaft support structure 128 through bearings 130 and has a leading end axial portion 132 formed with longitudinal grooves or serrations and projecting forwardly from the shaft housing 128. To the longitudinally grooved end portion 132 of the shaft 104 is splined the gear 106 which is in mesh with the gear 108 connected to the steering wheel angle sensor 110 previously described. The gear 106 is thus not only rotatable with the steering wheel shaft 104 as in the embodiment shown in FIG. 1 but is, different from the embodiment of FIG. 1, longitudinally movable on the grooved or serrated end portion 132 of the steering wheel shaft 104. The gear 106 of the embodiment shown in FIG. 2 is further formed with clutch teeth 134 on its face confronting the helically grooved shaft 32. Similarly to the gear 106, the gear 92 connected to the helically grooved shaft 32 is formed with clutch teeth 136 which are engageable with the clutch teeth 134 of the gear 106. The clutch teeth 134 and 136 thus formed on the gears 106 and 92, respectively, are biased to be disengaged from each other by means of a preload spring 138 which is seated on the gears 106 and 92 and which is operative to urge the axially movable gear 106 away from the gear 92 which is axially held stationary.

The steering shaft support structure 128 is formed with a generally cylindrical cavity 140 which concentrically surrounds an intermediate portion of the steering wheel shaft 104 and which is open at one axial end adjacent to the longitudinally grooved end portion 132 of the steering wheel shaft 104 and closed at the other axial end by an end wall 128a forming part of the steering shaft support structure, 128, as shown. In the cylindrical cavity 140 is received axially aligned sleeves 142 and 144 which are axially slidable on the steering shaft support structure 128 and movable relative to the intermediate portion of the steering wheel shaft 104. One sleeve 142 is located close to the end wall 128a of the steering shaft support structure 128 and the other sleeve 144 is engageable at one axial end with the former sleeve 142 and at the other axial end with the gear 106 having the clutch teeth 134. The sleeves 142 and 144 are urged to be axially spaced apart from each other by means of a preload spring 146 which is seated at one end on an inner annular projection of the sleeve 142 and at the other end on an inner annular projection of the sleeve 144.

The sleeves 142 and 144 are formed with annular pressure acting faces 142a and 144a, respectively, by which separate chambers 148 and 150 are formed in the cylindrical cavity 140 in the steering shaft support structure 128. One chamber 148 is in communication with an auxiliary hydraulic fluid source 152 through a port 154 formed in the steering shaft support structure 128, a fluid passageway 156 leading from the fluid source 152 to the port 154 and a control valve unit 158 interposed in the fluid passageway 156. The other chamber 150 in the steering shaft support structure 128 is in communication with the previously mentioned hydraulic fluid source 60 through a port 160 formed in the steering shaft support structure 128 and a fluid passageway 162 leading from the hydraulic fluid source 60 to the port 160. From the fluid passageway 162 thus interconnecting the hydraulic fluid source 60 and the chamber 150 in the steering shaft support structure 128 is branched a drain passageway 164 which is in communication over a solenoid operated control valve 166 to a sump 168.

The control valves 158 and 168 are controlled by means of a valve actuator 170 which in turn is controlled by a fluid pressure sensor 172. The pressure sensor 172 is interposed in the fluid passageway 162 leading from the hydraulic fluid source 60 and is adapted to produce an output signal when the pressure of the fluid acting on the hydraulic control valve unit 40 and accordingly on the hydromechanical leverage unit 14 happens to drop below a predetermined level and thus fails to properly move the piston-valve 70 of the valve unit 40 and the piston 18 of the leverage unit 14. Where desired, a manual control switch 174 may be provided so as to manually make the valve actuator 170 to become operative to actuate the control valves 158 and 166. An indication lamp 176 may also be connected between the control valve 166 and the valve actuator 170 so as to visually indicate a manual or non-assisted steering condition of the vehicle.

The angle sensor 122 forming part of the control circuit to control the pulsating-current d.c. motor 98 is herein shown as having a gear 178 which is in mesh with a gear 180 rotatable with or formed on the gear 86 rotatable with the nut member 84 of the valve re-set mechanism. The angle sensor 122 in the embodiment shown in FIG. 2 is thus adapted to a signal representative of the angle of rotation of the gear 86 and accordingly the amount of longitudinal displacement of the piston 18 of the leverage unit 14. The amount of longitudinal displacement of the piston 18 is proportional to the angle of rotation of the output shaft 100 of the pulsating-current d.c. motor 98 and therefore the signal produced by the angle sensor 122 is representative of the angle of rotation of the motor output shaft 100 as in the case of the embodiment illustrated in FIG. 1. Designated by reference numeral 182 is a reaction unit which may be connected to the steering wheel 102 via the gears 106 and 108 and the steering wheel shaft 104 so as to give an operator of the steering system a feeling of reaction which is proportional to the steering load. The reaction unit 182 of this nature is in itself well known in the art and is, therefore, herein shown as merely in a block form for the brevity of illustration.

When, now, the hydraulic arrangement including the hydromechanical leverage unit 14 and the hydraulic control valve unit 40 is operating under proper conditions so that the fluid pressure acting on the piston-valve 70 of the valve unit 40 and accordingly the piston 18 of the leverage unit 14 is maintained at a proper working level, the fluid pressure delivered from the hydraulic fluid source 60 to the chamber 150 in the steering shaft support structure 128 through the fluid passageway 162 acts on the annular pressure working face 144a of the sleeve 144. The sleeve 144 is thus urged against the sleeve 142 against the opposing force of the preload spring 146 so that the gear 106 splined to the longitudinally grooved end portion 132 of the steering shaft 104 is urged away from the gear 82 on the helically grooved shaft 32. The clutch teeth 134 on the gear 106 is accordingly kept disengaged from the clutch teeth 136 on the gear 92 with the result that the steering wheel shaft 104 is maintained uncoupled from the helically grooved shaft 32. Under these conditions, the pressure sensor 172 produces no output signal so that the valve actuator 170 is held inoperative to actuate the control valve 158 and 166. The control valves 158 and 166 are thus kept closed so that no fluid pressure acts on the annular pressure acting face 142a of the sleeve 142. The leverage unit 14 is consequently controlled in accordance with the electric control circuit comprising the control module 112 as previously discussed with reference to FIG. 1.

In the event, however, the pressure of the fluid delivered from the hydraulic fluid source 60 happens to drop or the hydraulic arrangement including the leverage unit 14 and the valve unit 40 happens to operate properly so that the fluid pressure acting on the piston-valve 70 of the control valve unit 40 and the piston 18 of the leverage unit 14 is reduced below the proper working level, then the pressure sensor 172 responds to the pressure drop and supplies a signal to the valve actuator 170. The control valves 158 and 170 are thus concurrently actuated to open so that the fluid under pressure is directed from the auxiliary hydraulic fluid source 152 into the chamber 148 in the steering shaft support structure 128 through the fluid passageway 156 and the port 154 in the structure 128 and at the same time the fluid in the passageway 162 is discharged to the sump 168 through the drain passageway 164. The fluid under pressure from the auxiliary fluid source 152 thus acts on the annular pressure acting face 142a of the sleeve 142 which accordingly presses the sleeve 144. In the absence of the fluid pressure acting on the annular pressure acting face 144a of the sleeve 144, the sleeves 142 and 144 are axially moved together away from the end wall 128 defining the cavity 140 in the steering shaft support structure so that the gear 106 is axially moved on the longitudinally grooved end portion 132 of the steering wheel shaft 104 toward the gear 92 on the helically grooved shaft 32 against the opposing force of the preload spring 138 seated between the gears 106 and 92. The clutch teeth 134 on the gear 106 are thus meshed with the clutch teeth 92 and as a consequence the steering wheel shaft 104 is coupled to the helically grooved shaft 32 via the clutch teeth 134 and 136 on the gears 106 and 92, respectively. The rotational motion of the steering wheel 102 is transmitted directly to the helically grooved shaft 32 so that the sector gear 28 of the leverage unit 14 is turned about its axis by reason of the engagement between the helically grooved shaft 32 and the piston 18 through the balls 36 and the engagement between the toothed rack 26 and the sector gear 28. The mechanism thus constituted between the steering wheel 102 and the sector gear 28 is similar in effect to that of the known reciprocating-ball steering system and is accordingly manually operated without aid of hydraulic power assistance. When desired, the valve actuator 170 may be made operative through manipulation of the manually control switch 174 so that the manually operated condition of the steering system is brought into play even when the hydraulic arrangement of the steering system is operating properly.

What is claimed is:

1. An automotive power-assisted steering system comprising:
   a steering wheel;
   a steering shaft carrying the steering wheel and a steering linkage drivingly connected to steered road wheels;
   a hydromechanical leverage unit mechanically connected to the steering linkage and movable between a right-turn positional range to drive the steering linkage into a condition effecting right-turn of the steered road wheels and a left-turn positional range to drive the steering linkage into a condition effecting left-turn of the steered road wheels;

a rotary piston-valve rotatable about a longitudinal axis thereof and longitudinally movable between first and second positional ranges across an equilibrium position depending upon its rotational position about said axis, the rotary piston-valve being hydraulically connected to said leverage unit for moving the leverage unit into the right-turn or left-turn positional range when moved to the first or second positional range, respectively, thereof or holding the leverage unit in a locked condition when moved to said equilibrium position;

a valve re-set mechanism operatively connected between the leverage unit and the rotary piston-valve and operative to be driven by the leverage unit for longitudinally moving the rotary piston-valve from the first or second positional range back to the equilibrium when the leverage unit is moved by the piston-valve to the right-turn or left-turn positional range, respectively, thereof;

a drive source having an output shaft drivingly connected to the rotary-valve for driving the piston-valve about said axis when actuated; and an electric control circuit including means responsive to turning of the steering wheel for producing a first signal related to the angle and direction of turning of the steering wheel, means responsive to the velocity of the vehicle for producing a second signal related to the velocity of the vehicle, means responsive to an external force imparted sideways to the vehicle for producing a third signal related to the intensity of the force, a control module receiving the first second and third signals from the means for thereby producing an output signal representative of a desired angle of steering, means for producing a fourth signal representative of the rotational position of the output shaft of the said drive source, a comparator operative to compare the output signal from said control module with the fourth signal for producing an output signal representative of a difference between the two signals which are introduced thereto, an analog-to-digital converter for converting the output signal from the comparator into a pulsating signal, and a drive pulse generator for supplying to said drive source a pulsating current in accordance with the pulsating signal from the analog-to-digital converter, whereby the drive source is actuated to have its output shaft rotated in a direction and through an angle dictated by the pulsating current from the pulse generator.

2. An automotive power-assisted steering system as claimed in claim 1, further comprising hydromechanical clutch means disposed between the steering wheel and the hydromechanical leverage unit, the clutch means being biased into an uncoupled condition so that the steering wheel is urged to remain mechanically disengaged from the leverage unit, and control means responsive to the fluid pressure acting on the leverage unit and the rotary piston-valve for actuating the clutch means to be coupled in response to a decrease of the fluid pressure below a predetermined level so that the hydromechanical leverage unit is mechanically coupled to the steering wheel and is rendered operative to be driven direct by the steering wheel independently of said control circuit and said rotary piston-valve.

3. An automotive power-assisted steering system as claimed in claim 2, in which said leverage unit comprises a housing, a piston axially movable in the housing, toothed rack longitudinally movable with the piston, and a sector gear in mesh with the toothed rack and drivingly connected to the steering linkage, and in which said valve re-set mechanism comprises an internal groove formed in said piston of the leverage unit, a shaft rotatably supported on said housing and formed with an external helical groove which is in correspondence with the internal helical groove in the piston, and balls received in the corresponding helical grooves in the piston and the shaft on the housing so that the piston is axially moved as the shaft on the housing is rotated about its longitudinal axis, wherein said clutch means comprise a first clutch member rotatable with said shaft on the housing and a second clutch member rotatable with the steering shaft carrying the steering wheel.

4. An automotive power-assisted steering system as claimed in claim 3, in which said steering shaft is positioned and directed substantially in line with the helically grooved shaft and in which said second clutch member is axially movably carried on the steering shaft and is biased to be axially spaced apart from the first clutch member.

5. An automotive power-assisted steering means as claimed in claim 4, in which said control means associated with said clutch means comprise first and second sleeves in line with said second clutch member and movable along the steering shaft and having respective pressure acting faces, the pressure acting face of the first sleeve being acted upon by the fluid pressure acting on said leverage unit and said rotary piston-valve for urging the first and second sleeves into axial positions to have the second clutch member uncoupled from the first clutch member when the fluid pressure acting on the leverage unit and the rotary piston-valve is maintained on or over said predetermined level, a fluid pressure sensor responsive to the fluid pressure acting on the leverage unit and the rotary piston-valve for producing the signal in response to a decrease of the fluid pressure below said predetermined level, a source of fluid under pressure to act on the pressure acting face of the second sleeve, a first control valve operative to direct the fluid pressure from said source onto the pressure acting face of the second sleeve in response to the signal from said fluid pressure sensor, and a second control valve operative to drain the fluid acting on the first sleeve in response to the signal from the fluid pressure sensor so that said first and second sleeves are axially moved into positions to cause said second clutch member to be coupled with the first clutch member when the fluid presure acting on the leverage unit and the rotary piston-valve is decreased under said predetermined level.

6. An automotive power-assisted steering system as claimed in claim 5, in which said control means further comprise a resilient biasing member urging said first and second clutch members away from each other and a resilient biasing member urging said first and second sleeves axially away from each other.

7. An automotive power-assisted steering system as claimed in claim 1, in which said hydromechanical leverage unit comprises a hermetically closed housing, a piston axially slidable in said casing and dividing the housing into first and second chambers, a toothed rack formed longitudinally on the piston, and a sector gear which is in constant mesh with said toothed rack and mechanically connected to the steering linkage, said chambers being in communication with a source of fluid under pressure over said rotary piston-valve and axially moved to drive the sector gear through said toothed rack as said rotary piston-valve is moved between said first and second positional ranges.

8. An automotive power-assisted steering system as claimed in claim 7, in which said valve re-set mechanism comprises a screw rotatable with said rotary piston-valve, a nut member rotatable on said screw member and held stationary in a longitudinal direction, the nut member having an internal thread through which the screw member is being rotatable engagement with the nut, and translatory means mechanically connected between said piston of the leverage unit and said nut member for translating an amount of axial displacement of the piston into a substantially proportional angular movement of said nut member for longitudinally moving the rotary piston-valve into the equilibrium position from the first or second positional range thereof when the piston of the leverage unit has been moved by fluid pressures in said chambers.

9. An automotive power-assisted steering system as claimed in claim 8, in which said translatory means comprise an internal helical groove formed on said piston, a shaft rotatably supported on said housing of the leverage unit and formed with an external helical groove which is in correspondence with said internal helical groove in said piston, balls received in the corresponding helical grooves in said piston and said shaft on said housing so that the shaft on said housing is rotated about its longitudinal axis as said piston is axially moved on the shaft through said balls, a first gear rotatable with said shaft on the housing and a second gear which is in constant mesh with the first gear and which is rotatable with said nut member.

10. An automotive power-assisted steering system as claimed in claim 1, in which the output shaft of said drive source is drivingly connected to said rotary piston-valve through a first gear rotatable with the output shaft and a second gear which is in constant mesh with the first gear and which is rotatable with the rotary piston-valve, said second gear having a greater number of teeth than said first gear.

11. An automotive power-assisted steering system as claimed in claim 1, in which said control circuit further comprises means responsive to automatic steering signals issuing from a road furnished with vehicle guide means for controlling said drive source in accordance with the automatic steering signals.

* * * * *